(12) United States Patent
Coalson

(10) Patent No.: US 9,311,058 B2
(45) Date of Patent: Apr. 12, 2016

(54) JABBA LANGUAGE

(71) Applicant: Yahoo! Inc., Sunnyvale, CA (US)

(72) Inventor: Josh Coalson, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 309 days.

(21) Appl. No.: 13/842,826

(22) Filed: Mar. 15, 2013

(65) Prior Publication Data

US 2014/0282393 A1 Sep. 18, 2014

(51) Int. Cl.
*G06F 9/44* (2006.01)

(52) U.S. Cl.
CPC .................................. *G06F 8/31* (2013.01)

(58) Field of Classification Search
None
See application file for complete search history.

(56) References Cited

U.S. PATENT DOCUMENTS

| | | | |
|---|---|---|---|
| 5,610,812 A | 3/1997 | Schabes et al. | |
| 6,910,004 B2 | 6/2005 | Tarbouriech et al. | |
| 7,702,508 B2 * | 4/2010 | Bennett | 704/257 |
| 8,473,442 B1 | 6/2013 | Deninger et al. | |
| 2005/0283507 A1 | 12/2005 | Souvignier et al. | |
| 2007/0271255 A1 * | 11/2007 | Pappo | 707/5 |
| 2008/0114738 A1 * | 5/2008 | Chao | 707/3 |
| 2009/0182644 A1 | 7/2009 | Panagopulos et al. | |
| 2011/0173174 A1 * | 7/2011 | Flitcroft | 707/707 |

OTHER PUBLICATIONS

U.S. Appl. No. 13/843,292, filed on Mar. 15, 2013, 48 pages.
U.S. Appl. No. 113/843,292: Filing Receipt, mailed May 13, 2013, 3 pages.
U.S. Appl. No. 13/843,292: Notice to File Missing Parts, mailed May 13, 2013, 2 pages.
U.S. Appl. No. 13/843,292: Authorization for extension of time, mailed Jun. 24, 2013, 3 pages.
U.S. Appl. No. 13/843,292: Response to Pre-Exam Formalities Notice, filed Jun. 24, 2013, 4 pages.
U.S. Appl. No. 13/843,292: Filing Receipt, mailed Jul. 3, 2013, 3 pages.
U.S. Appl. No. 13/843,292: Notice of Publication, mailed Sep. 18, 2014.
U.S. Appl. No. 13/843,292: Examiner's Search Strategy and Results, mailed Nov. 5, 2014, 3 pages.
U.S. Appl. No. 13/843,292: Non-Final Rejection, mailed Nov. 5, 2014, 10 pages.
U.S. Appl. No. 13/843,666, filed on Mar. 15, 2013.
U.S. Appl. No. 13/843,666: Notice to File Missing Parts, mailed May 10, 2013, 2 pages.
U.S. Appl. No. 13/843,666: Filing Receipt, mailed May 10, 2013, 3 pages.
U.S. Appl. No. 13/843,666: Response to Pre-Exam Formalities Notice, filed Jun. 24, 2013, 60 pages.
U.S. Appl. No. 13/843,666: Filing Receipt, mailed Jul. 2, 2013, 3 pages.
U.S. Appl. No. 13/843,666: Notice of Publication, mailed Sep. 18, 2014, 1 page.
U.S. Appl. No. 13/843,292: Amendment/Req Reconsideration After Non-Final Rejection, filed Feb. 5, 2015, 11 pages.

(Continued)

*Primary Examiner* — Evral Bodden

(74) *Attorney, Agent, or Firm* — Berkeley Law & Technology Group, LLP

(57) ABSTRACT

Example methods, apparatuses, or articles of manufacture are disclosed that may be implemented, in whole or in part, using one or more computing devices to facilitate or otherwise support one or more processes or operations for Jabba language.

21 Claims, 9 Drawing Sheets

```
comment         \/\/[^\n]*
integer         0|([1-9][0-9]*)

json_null       null
json_true       true
json_false      false
json_number     -?(0|([1-9][0-9]*))(\.[0-9]+)?([eE][-+]?[0-9]+)?
json_string     \"([^\000-\031\"\\]|\\([\"\\\/bfnrt]|(u[0-9a-zA-Z]{4})))*\"

private         private identifier      [a-zA-Z_][a-zA-Z_0-9]* hat_brace       \^\{
squiggle_brace  ~\{
logical_and     &&
logical_or      \|\|
punctuation     [`!@#$%^&*()=+,.?;:|<>\[\]{}]
whitespace      [ \f\r\t\v]+
```

(56) References Cited

OTHER PUBLICATIONS

U.S. Appl. No. 13/843,292: Final Rejection and Examiner's Search Strategy, mailed Mar. 19, 2015, 16 pages.
U.S. Appl. No. 13/843,666: Non-Final Rejection and Examiner's Search Strategy, mailed Mar. 24, 2015, 22 pages.
U.S. Appl. No. 13/843,292: Response After Final Action and Amendments, filed Jun. 19, 2015, 11 pages.
U.S. Appl. No. 13/843,292: Advisory Action and Amendment, mailed Jul. 1, 2015, 4 pages.
U.S. Appl. No. 13/843,292: Request for Continued Examination and Amendments, filed Jul. 20, 2015, 15 pages.
U.S. Appl. No. 13/843,666: Amendment/Req Reconsideration After Non-Final Rejection and Amendments, filed Jul. 24, 2015, 15 pages.
U.S. Appl. No. 13/844,013: Amendment/Req Reconsideration After Non-Final Rejection and Amendments, filed Jul. 24, 2015, 9 pages.

* cited by examiner

| | |
|---|---|
| comment | \/\/[^\n]* |
| integer | 0\|([1-9][0-9]*) |
| json_null | null |
| json_true | true |
| json_false | false |
| json_number | -?(0\|([1-9][0-9]*))(\.[0-9]+)?([eE][-+]?[0-9]+)? |
| json_string | \"([^\000-\031\"\\]\|\\([\"\\/bfnrt]\|(u[0-9a-zA-Z]{4})))*\" |
| private | private |
| identifier | [a-zA-Z_][a-zA-Z_0-9]* |
| hat_brace | \^\{ |
| squiggle_brace | ~\{ |
| logical_and | && |
| logical_or | \|\| |
| punctuation | ['!@#$%^&\*()\*=+,.?;:\|<>\{[\]\}{}] |
| whitespace | [ \f\r\t\v]+ |

FIG. 1

```
%token JSON_NULL
%token JSON_TRUE
%token JSON_FALSE
%token JSON_NUMBER
%token JSON_STRING %token INTEGER
%token IDENTIFIER %token PRIVATE
%token JUNK %token HAT_BRACE
%token SQUIGGLE_BRACE %left    LOGICAL_AND LOGICAL_OR
%right   '!'
%left    '*' '+' '?'

%% rules:
        /*empty*/
      | rules rule
        ;

rule:
        IDENTIFIER '=' expr ';'
      | PRIVATE IDENTIFIER '=' expr ';'
        ;
```

```
expr:   counted_term                        /* matching only */
      | counted_term '`' action_seq '`'     /* matching with associated actions */
      | counted_term '#' string             /* matching with single action slot assignment
                                               (shorthand for `string;$^` */
      ;

counted_term:
        term
      | term '?'                             /* 0 or 1 */
      | term '*'                             /* 0 or more */
      | term '+'                             /* 1 or more */
      ;

term:   '(' exprs ')'
      | SQUIGGLE_BRACE exprs '}'             /* ~{} unordered sequence */
      | HAT_BRACE exprs '}'                  /* ^{} mirror sequence */
      | '[' exprs ']'                        /* [] alternation */
      | '@' IDENTIFIER                       /* ID is rule to "call" */
      | '@' IDENTIFIER ':' '$' IDENTIFIER /* 1st ID is rule to "call"; return val -> local var in 2nd ID */
      | match_expr
      ;

exprs:  expr
      | exprs expr
      ;
```

```
match_expr:
%True()*/                                            /*match span, shorthand for
  | string
  | '<' '>'                                          /*match span value*/
  | '<' span_class_attr '>'                          /*match span, shorthand for .*/
  | '%' IDENTIFIER '(' ')'                           /*match span class and attribute*/
  | '%' IDENTIFIER '(' json_array_elements ')'       /*built-in boolean predicates*/
  | '!' match_expr                                   /*logical NOT*/
  | match_expr LOGICAL_AND match_expr                /*logical AND*/
  | match_expr LOGICAL_OR match_expr                 /*logical OR*/
  | '(' match_expr ')'                               /*grouping*/
  ;

span_class_attr:
    string                                           /*match class only*/
  | ':' span_attr                                    /*match any class and one
attribute*/
  | string ':' span_attr                             /*match class and one attribute*/
  ;

span_attr:
    string                                           /*match attribute key*/
  | string '?'                                       /*equivalent to string=true*/
  | string '=' IDENTIFIER                            /*match attribute key and value*/
  | string '=' json_value                            /*match attribute key and value*/
  | string '@' string                                /*match taxonomy key and node*/
  | string '@' string '.' '.' '.'                    /*match taxonomy key and subtree*/
  ;
```

```
action_seq:
    action
    | action_seq ';' action
    ;

action:
    slot_assignment
    object*/                                    /*add a new slot in the domain
    | general_assignment
    decoration*/                                /*generic access to interpretation
    | variable_assignment                       /*assign to local variables or rule
    return value*/
    ;

slot_assignment:
    string ':' action_value                     /*add a slot match*/
    ;

general_assignment:
    string '=' general_assignment_value         /*decoration key <- value*/
    ;

variable_assignment:
    '$' '=' general_assignment_value            /*return value <- value*/
    | '$' string '=' general_assignment_value   /*variable <- value*/
    ;

general_assignment_value:
    action_value
    | json_value                                /*decoration value*/
    ;
```

```
action_value:
    '$' '^'          /*means 'the span ids covering the match'*/
  | '$' IDENTIFIER   /*means value of given local variable*/
  ;

string:
    IDENTIFIER       /*can write strings with limited charset*/
  | JSON_STRING      /*can represent any unicode string*/
  ;

/* our INTEGER token is simpler than full JSON number syntax but overlaps
 * with it so in places where we want a JSON number we must accept both
 */
number:
    INTEGER
  | JSON_NUMBER
  ;

json_value:
    JSON_STRING
  | number
  | JSON_TRUE
  | JSON_FALSE
  | JSON_NULL
  | json_array
  | json_object
  ;
```

```
json_array:
        '[' ']'
    | '[' json_array_elements ']'
    ;

json_array_elements:
        json_array_elements ',' json_value
    | json_value
    ;

json_object:
        '{' '}'
    | '{' json_object_members '}'
    ;

json_object_members:
        json_object_members ',' json_object_pair
    | json_object_pair
    ;

json_object_pair:
        JSON_STRING ':' json_value
    ;

JABBA LANGUAGE

BACKGROUND

1. Field

The present disclosure relates generally to data processing in a computing environment, and, more particularly, to data processing in connection with Jabba language for use in or with computing systems in a computing environment.

2. Information

The Internet is widespread. The World Wide Web or simply the Web, provided by the Internet, is growing rapidly, at least in part, from the large amount of content being added seemingly on a daily basis. A wide variety of content, such as one or more electronic documents, for example, is continually being identified, located, retrieved, accumulated, stored, or communicated. Various information databases including, for example, knowledge bases or other collections of content, Web-based or otherwise, have become commonplace, as have related communication networks or computing resources that help users to access relevant information. Effectively or efficiently identifying or locating content may facilitate or support information-seeking behavior of users and may lead to an increased usability of a search engine.

With a large amount of content being available, a number of tools may often be provided to allow for copious amounts of information to be searched through in an efficient or effective manner. For example, service providers may allow users to search the Web or other networks, databases or other data repositories, etc. using search engines. In some instances, certain tools, such as Regular Expressions (RE), Grammar Specification Language (GSL), or the like may be used, at least in part, in connection with search engines to facilitate or support matching of sequences or strings of characters, character classes, etc. representative of content, Web-based or otherwise. In addition to a search, these or like tools may, for example, be utilized in connection with a text input validation, e-mail spam filtering, computer intrusion detection, dynamic field population, or the like. At times, however, certain tools may be characterized or defined by syntax that may require relatively large or complicated expressions or programming patterns. This may be labor-intensive or error-prone, for example, waste memory resources, increase a number of processing operations, etc., or otherwise produce incorrect or undesirable results.

BRIEF DESCRIPTION OF THE DRAWINGS

Non-limiting and non-exhaustive aspects are described with reference to the following figures, wherein like reference numerals refer to like parts throughout the various figures unless otherwise specified.

FIGS. 1-7 illustrate an example of an implementation of a Jabba grammar.

DETAILED DESCRIPTION

Figure 8:
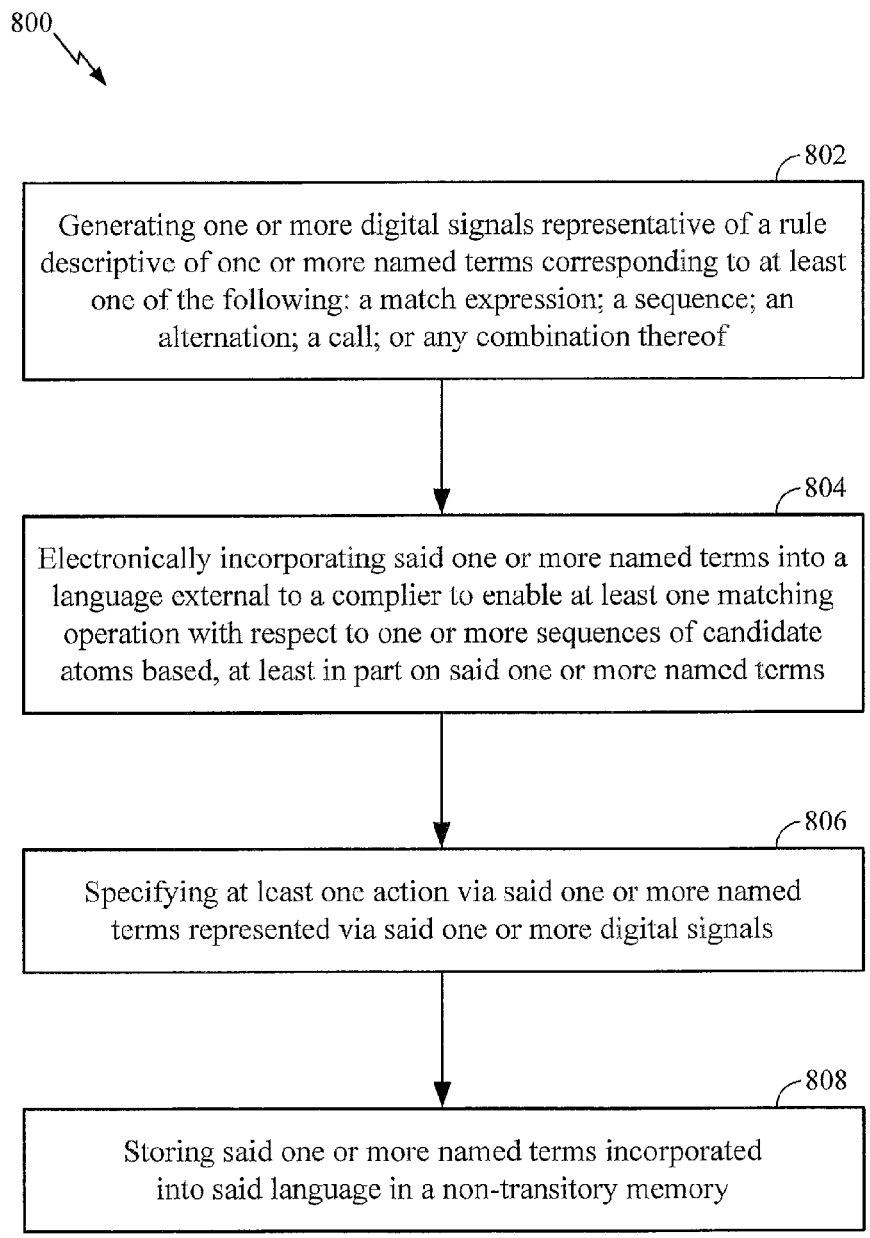
FIG. 8 is a flow diagram illustrating an implementation of an example process for Jabba language.

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, or articles of manufacture are disclosed herein that may be used, in whole or in part, to facilitate or support one or more processes or operations for Jabba language. As will be described in greater detail below, Jabba is a language that may be implemented in a computing environment and may be utilized, at least in part, to match or generate sequences of text, specify a number of actions to one or more match events, or the like. In some instances, text may include structured text, as will also be seen. Jabba language may be utilized, at least in part, in connection with an on-line search (e.g., query classification, etc.), contextual tagging, e-mail spam or query filtering, interpretation overrides generation, etc., just to name a few examples. As used herein, "on-line" may refer to a type of a communication that may be implemented via one or more communications networks, such as, for example, the Internet, an intranet, a communication device network, or the like. Communications networks may comprise, for example, a wireless network, wired network, or any combination thereof.

Briefly, a search engine may typically comprise a computing platform that may, for example, help a user to locate, retrieve, match, etc. content of interest. The terms like "user," "developer," "designer," or "programmer" may be used interchangeably herein. In some instances, content may include, for example, on-line content, such as one or more web documents of a particular interest. As used herein, "web document" or "electronic document" may be used interchangeably and may refer to one or more digital signals, such as communicated or stored signals, for example, representing a source code, text, image, audio, video file, or the like. As a way of illustration, web documents may include a web page, a news feed, a rating or review post, a status update, a portal, a blog, an e-mail, a text message, an Extensible Markup Language (XML) document, a web page pointed to by a Uniform Resource Locator (URL), a collection of user-generated content, etc., just to name a few examples. At times, web documents may include one or more embedded references or hyperlinks to images, audio or video files, or other web documents. One common type of reference may comprise, for example, a URL.

In some instances, text patterns associated with web documents may, for example, be matched to a search query or like text input via one or more processing operations in connection with a suitable search engine, such as an on-line search engine, pattern-matching search engine, etc., or any combination thereof. As will be seen, Jabba language may, for example, be used, at least in part, to define or characterize patterns, annotations, etc. in connection with these one or more processing operations. For example, a Jabba language-supported search engine may interpret one or more provided syntax rules and may perform one or more matching operations with respect to a target character string, buffer, file, web document, etc. Search results of one or more matching operations may comprise, for example, one or more web documents presented to a user (e.g., as via a graphical user interface) in an ascending or descending order of keyword relevance. In the context of an on-line search, "keyword" may refer to one or more words or symbols within a web document that may characterize or otherwise suggest content of the web document. In some instances, search results may comprise, for example, one or more "match" or "no-match" values representative of respective "found" or "not found" Boolean results. Of course, these are merely details relating to search engines and claimed subject matter is not so limited.

As alluded to previously, the difficulty or complexity of expressions or programming patterns, such as to facilitate or support matching content of interest, for example, may typically increase with a complexity of a matching or classification task. To address these challenges, certain tools, such as in RE, GSL, etc. may, for example, require building a custom grammar recognizer, task-specific language parser, or the like along with an execution environment since, at times, no known or otherwise suitable language with applicable syntactical features may exist. This may be time-consuming or otherwise resource-expensive, as previously mentioned. Another challenge may be that relatively often specifying sequences in RE may be rather primitive, meaning that a single sequence or simple disjunctions may be allowed. At times, GSL may allow for sub-sequences, disjunctions, or sub-rules, for example, but less expressive syntax may make development of matching tasks in GSL relatively labor-intensive, however. In addition, in some instances, it may be difficult to implement a relatively simple Jabba pattern in RE or GSL, for example, since structured text is not sufficiently representable in RE or GSL alphabets (e.g., characters, symbols, etc.), as will also be seen. Accordingly, it may be desirable to develop one or more methods, systems, or apparatuses that may implement more effective or efficient language constructs for more sophisticated matching of text, action semantics, etc., such as via more expressive syntax, for example.

Thus, one or more techniques for Jabba language are presented herein in which one or more sequences of text, such as structured text, for example, may be matched or generated, and one or more specified actions may be defined. Jabba language may, for example, allow for more effective or efficient interpretation tagging, such as creation of domain decorations on interpretation objects that may provide information about the interpretation in general (e.g., a context) as well as pieces of the interpretation in particular. In addition, due, at least in part, to more flexible action semantics, Jabba language may, for example, be suitable for use in interpretation filters, for query classification, generating overrides, or the like, as previously mentioned. For example, with respect to query classification, Jabba language may facilitate or support assigning classes to one or more queries as well as extracting functional components. Jabba language may also be used, at least in part, for recognizing or discarding incorrect or insufficient query interpretations, such as in connection with query filtering, for example. Also, Jabba language may, for example, facilitate or support generating overrides by forcing known-correct interpretations via editorial rules. Of course, these are merely examples relating to Jabba language implementations, and claimed subject matter is not so limited.

For purposes of explanation, somewhat similarly to how RE may match sequences of characters or specify actions (e.g., store matched segments in pattern buffers, etc.), Jabba language, which may herein be called simply Jabba, may be used, at least in part, to match sequences of atoms or specify relatively complex actions characterizing various match processes. As used herein, "Jabba atoms" or simply "atoms" may be used interchangeably and may refer to one or more text fragments that may be classified or tagged with one or more attributes. As will be described in greater detail below, Jabba actions may, for example, cause callbacks to a client to be invoked. It should be appreciated that even though one or more techniques are described herein in connection with interpretation tagging, such as for purposes of explanation, techniques or any aspects thereof may be implemented in connection with any suitable application without deviating from the scope of claimed subject matter and are not limited to a particular taxonomy illustrated herein. For example, it will be understood by skilled artisans that application-specific terms, such as "span," "interpretation," "decoration," etc. may be used interchangeably with analogous or equivalent Jabba terms, such as "atom," "atom sequence," "attribute," etc., respectively. To illustrate, as will be seen, Jabba matching semantics may, for example, be characterized or specified in terms of "atoms" as well as "spans." The former may reference an abstract representation of structured or annotated text, such as while describing Jabba language, for example, and the latter may reference an application-specific implementation of an atom, such as while describing an atom, which maps to a classified fragment of a search query. Again, these are merely examples relating to usage of terms to which claimed subject matter is not limited.

More specifically, Jabba statements may include, for example, syntax rules defining which sequences of atoms may be matched. Thus, depending on an implementation, an atom may comprise, for example, a data structure representing a fragment of text (e.g., a token in a search query, etc.), a class (e.g., "place_name," etc.), a set of key-value attributes (e.g., "place_type"="city", "is_unique"=false, etc.), or any combination thereof. In some instances, Jabba rules may, for example, be built up or created from Boolean match expressions that may match different or otherwise suitable aspects of a candidate atom. Again, for ease of understanding, a Jabba atom may be conceptually thought of as a structural equivalent of a character in RE, and a Jabba rule may be thought of as a named equivalent of an RE pattern. Jabba match expressions may, for example, be conceptualized as characters or character classes in RE patterns, for example, except that Jabba match expressions may comprise arbitrary Boolean functions on different parts of a candidate atom. As such, Jabba may provide benefits over RE, GSM, or like tools, as will be apparent.

As a way of illustration, consider, for example, a system or process that may tokenize a search query or assign a token to a class with a default class being "token" if nothing else is known about it. For this example, a Jabba atom may comprise a classified token, for example. A Jabba rule may be used, at least in part, to match a query in which a person's name is followed by some image directive, for example, and may trigger callbacks to indicate which atoms make up the person's name and which atoms make up the image directive. In other words, Jabba may facilitate or support attaching a domain for images to an interpretation, for example, with pointers back to which spans composed the person's name and which spans composed the image directive. As used herein, "span" may refer to one or more parts, substrings, etc. of a search query and may comprise, for example, a class, a referent, or any combination thereof. A class is typically, although not necessarily, some classification of a span according to a suitable taxonomy, such as person_name, place_name, etc. A referent is typically, although not necessarily, an optional identifier of one or more entities capable of uniquely specifying these one or more entities within a class.

By way of example but not limitation, the image rule discussed above may, for example, be defined as:
image={<person_name>#person [picture pictures]#directive};

This rule may, for example, match an interpretation whose first atom or span has the class person_name and whose second atom or span is a token and whose value is either picture or pictures, and may create a slot called person to point to the person_name span and a slot called directive to point to the directive span. As used herein, "interpretation" may refer to one or more segmentation operations, such as with respect to a query, for example, wherein each fraction may comprise a span. Here, a call back to a client (e.g., a server, etc.) may, for example, be made with the atom's text person or directive identifying to a matching candidate atom. A Jabba-supported query classifier may, for example, also extract one or more suitable query components. A "slot" may refer to an identifier in a data structure that may comprise a value of a suitable type. For example, as illustrated in connection with the above example Jabba rule, a term followed by a # sign and a string may create an action, such that if the term is matched, a slot is created in an interpretation, named by that string, and whose value is an array of span identifiers (IDs) that the term matched.

Continuing with the above discussion, consider, for example, a candidate interpretation that may be matched against the image rule illustrated above:

```
Interpretation:
    id=15
    Modification:
        id=1
        query=[britney spears pictures]
        span=[0,7][britney]      id=2      class=token
        span=[8,6][spears]       id=3      class=token
        span=[15,8][pictures]    id=4      class=token
        span=[0,14][britney spears]  id=8  class=person_name
            decorations=
                [^taxonomy:notability_category]->"/notable"
        segmentation( )=[(britney)(spears)](pictures)
```

As seen, a segmentation line may comprise, for example, one or more tokens (e.g., syntactic spans, etc.) that may be in parentheses, and semantic spans that may be in square brackets. Thus, in some instances, a segmentation line may comprise, for example, a suitable sequence of syntactic and semantic spans that may cover a search query.

For this example, a segmentation of the interpretation is britney spears (span id=8) followed by pictures (span id=4). This may match the image rule, for example, and may trigger two actions. To illustrate, one action may, for example, include creating a person slot pointing to the britney spears span, and another action may include creating a directive slot pointing to the pictures span. In some instances, the interpretation's decorations may, for example, be augmented by these actions like:
Interpretation:
    id=15

```
    Modification:
        id=1
        query=[britney spears pictures]
        span=[0,7][britney]    id=2 class=token
        span=[8,6][spears]     id=3 class=token
        span=[15,8][pictures]  id=4 class=token
        span=[0,14][britney spears]   id=8 class=person_name
            decorations=
                [^taxonomy:notability_category]->"/notable"
        segmentation( )=[(britney)(spears)](pictures)
    decorations=
        [domain]->[
            {
                "name":"image",
                "schema":"jabba",
                "slots":{
                    "person":[8],
                    "directive":[4]
                }
            }
        ]
```

As seen, a new object was created in the "domain" decoration with a name matching a rule name, and named slots from the rule listing the span IDs of the spans that were matched. Of course, claimed subject matter is not limited to this particular example.

As will be described in greater detail below, Jabba may comprise, for example, rich or otherwise sufficient syntax that may be used, in whole or in part, for effective or efficient matching as well as action semantics in connection with a number of text processing or modeling applications. For example, if the above image rule is broader than desired, such as if only a celebrity is to be matched, the rule may, for example, be re-defined as:

```
image = { <person_name:notability_category@"
/notable">#person [ picture pictures ]#directive };
```

Thus, here, a first span may match if the class name is person_name and it has the decoration ^taxonomy:notability_category->"/notable". Again, these are merely examples relating to Jabba rules, and claimed subject matter is not so limited.

Jabba Syntax Elements.

Depending on an implementation, Jabba syntax elements may, for example, include those illustrated below. It should be appreciated that for purposes of explanation, one or more Jabba syntax elements may, for example, be described in the context of an interpretation tagger implemented in connection with a suitable computing platform analyzing user queries with classified dictionary, language models, or linguistic patterns so as to detect user intent. It should also be noted that in some instances, JavaScript Object Notation (JSON)-type string syntax may, for example, be employed, such as if appropriate or applicable. Claimed subject matter is not limited to a particular implementation, of course.

Match Expressions. A match expression may, for example, specify how to match a single span. For example, a match expression may comprise one or more subexpressions as well as operators capable of inspecting any suitable part of a span. To illustrate, in the image example above, <person_name> is syntax for matching a span whose class matches what is in angle brackets. Bare strings, such as picture or pictures may, for example, match a value of a span itself. Again, as previously mentioned, in the context of an application-specific implementation of Jabba language, a span may refer to an application-specific implementation of an atom, which maps to a classified fragment of a search query.

Sequences and Alternations. These may comprise collections of match expressions or other terms to match zero or more spans. In the image example above, the curly braces specified an ordered sequence of match expressions to match against the interpretation. To illustrate, the query britney spears pictures may, for example, match this rule, but b&w britney spears pictures or pictures britney spears may not.

Calls. A call may comprise, for example, an operation or process that may cause one or more other rules to be executed within a certain rule.

In the context of the present specification, match expressions, sequences, alternations, or calls may, for example, be called "terms."

Actions. An action may, for example, be specified via one or more terms to cause something to be added to interpretation decorations or to facilitate or support other variable assignments.

Rules. A Jabba rule may comprise, for example, one or more named terms. Without loss of generality, a rule may be run or applied against an interpretation, and, for a matching rule, one or more actions expressed in the rule may, for example, be triggered. As described below, in some instances, an implicit action may be specified via a rule to create a domain object with the rule's name and a schema jabba in interpretation decorations. As alluded to previously, in the context of an implementation of Jabba language, "domain object" may refer to an object (e.g., JSON-type, etc.) in which one or more results of some or all actions in a match may be collected or kept. Jabba code may comprise, for example, a list of rules that may be run in suitable order against an interpretation.

In some instances, Jabba may share certain syntax elements with RE, such as ?, +, * operators, and '.'. It may also have [ ] disjunction similar to GSL, and Jabba slot actions may have some semantic similarity to GSL slots. In addition, Jabba code may include C++-style comments. Thus, everything from // to the end of the line may, for example, be ignored. However, as illustrated herein, Jabba's syntax is more expressive, an action mechanism is more powerful, and an atom is more sophisticated than RE character classes or GSL types, for example. As such, Jabba may allow for a broader or otherwise sufficient range of implementations or uses than, for example, RE or GSL.

Example Jabba Rules.

As was indicated, a Jabba rule may, for example, identify an overall meaning for an interpretation and create slots for relevant parts of the interpretation to serve as pointers for a consumer of the interpretation to work back to original spans of interest that contribute to that meaning. In the image example above, a rewriter for an image search may, for example, strip one or more directive terms by looking up one or more span IDs of the directive slot and removing those spans from a search query. Typically, although not necessarily, "rewriter" may refer to a computing process that may modify or transform in some manner an appearance or form of an expression, statement, declaration, comment, construct, term, etc. without a change of a language. Rewriters are generally known and need not be described here in greater detail. Thus, in some instances, a people search rewriter may, for example, handle the person slot in a suitable manner.

A rule may, for example, include one or more slots that may directly relate to the meaning implied by the rule. For example, a rule may match an interpretation with one token in its segmentation. It should be noted that at times, it may be useful for a rule to cover a whole search query, such as to facilitate or support matching patterns, for example, rather than a part of a search query. Thus, the example rule:
blah=yahoo;
may, for example, match the interpretation:

```
Interpretation:
    id=15
    Modification:
        id=1
        query=[yahoo]
        span=[0,5][yahoo]    id=2    class=token
        segmentation( )=(yahoo)
``` rather than:

```
Interpretation:
    id=15
    Modification:
        id=1
        query=[yahoo search]
```

```
span=[0,5][yahoo]    id=2    class=token
span=[6,6][search]   id=3    class=token
segmentation( )=(yahoo)(search)
```

For this example, blah is the rule name, such as defined above, for example. Supported or so-called "legal" rule names may comprise, for example, legal identifiers that may match the regular expression [ a-zA-Z_] [ a-zA-Z_0-9] *, similarly to C or like language, though claimed subject matter is not so limited. It may be useful for rule names to be unique. For example, it may be useful for rule names to be a flat or general categorization of an interpretation (e.g., like a class taxonomy is for spans, etc.). At times, letter case may, for example, be significant or useful in Jabba. With regard to identifiers, it may be useful to avoid reserved words, such as private, null, true, false, just to name a few examples.

As seen, a Jabba rule name may be followed by an equals sign, then by a term used to match an interpretation, and a terminating semicolon. It should be noted that whitespace may not be significant or useful in Jabba. To illustrate, the above rule may also be defined as, for example:

```
blah =        //useless comment
    yahoo
;
```

Here, yahoo is a match expression that may match a token span (e.g., a span whose class is token). String literals like yahoo may, for example, serve as match expressions that match a value of a token span. In Jabba, string literals may comprise, for example, relatively simplified identifier syntax, or, optionally or alternatively, may comprise quoted JSON-type string literals if a value to match is not a legal or supported identifier, such as, for example, "yahoo !", "yahoo\u0021", or "private". In some instances, to match a span by a value regardless of its class, the value may be prefixed by a backslash, such as, for example, blah=\yahoo; or blah=\"yahoo". Optionally or alternatively, a "dot" or . may be used to match any span. Thus, the example rule
blah=.;
may, for example, match any interpretation with exactly one span in its segmentation.

In some instances, a simple string (e.g., identifier syntax, etc.) enclosed in angle brackets may, for example, match a class of a span. Thus, consider:
<person_name>
Optionally or alternatively, a span class may, for example, use JSON-type string syntax:
<"class name with spaces">
To match just a token instead of matching any span, the above rule may, for example, be re-defined as:
blah=<token>;
As a way of another example, given the search query SFO to SJC (e.g., "San Francisco to San Jose", etc.) one of its interpretations may, for example, match a travel rule and create an object like:

```
[domain]->[
    {
        "name":"travel",
        "schema":"jabba",
        "slots":{
            "destination":[ 36 ],
```

```
            "origin":[ 32 ]
        },
        "task":"flight"
    }
]
```

As illustrated, in some instances, there may be several components to an object. For example, a rule name itself may become a name field. A schema may be jabba. Also, there may be a slots object with zero or more named slots describing the function of parts of a search query in an interpretation. Particular examples of slot assignments will be described in greater detail below. In addition, there may be general assignments in rules that create other fields, as will also be seen. For this example, a task flag may indicate an overall task intent of the interpretation, for example.

Slots.

A slot may comprise, for example, a suitable data structure identifier capable of expressing a function or purpose of certain one or more spans in an interpretation, such as with respect to a rule, for example. To illustrate, a search query like directions from sunnyvale to oakland may include a slot called directive pointing to a span for directions, an origin slot for sunnyvale, as well as a destination slot for oakland. Claimed subject matter is not limited to these particular slots, of course. It should be noted that typically, although not necessarily, slots are not substitutes for inspecting spans. Thus, at times, so-called "A equals A" slots may not be warranted or useful since these slots typically add little or no information. For example, the following may not be warranted or useful:

```
private CITY_STATE = [
    <place_name:place_category@"/city">#city
    <place_name:place_category@"/state">#state
```

Depending on a system, in some instances, it may be useful not to capture a matched entity, such as a city or state, for example, in a slot since it may be determined via a span. Thus, at times, the following may, for example, be used:
directions={directions from ["here"<place_name>]#location};

Rule Task.

If a rule specifies a particular task, the rule may include a task field assigned according to a suitable interpretation taxonomy (e.g., a query analysis-related taxonomy, etc.). For example, a conversion task may be created for the reference query how many feet in 5 meters or:

```
Interpretation:
    id=55
    Modification:
        id=1
        query=[how many feet in 5 meters]
        decorations=
            [score]->0.465000
        span=[0,3][how]       id=2    class=token           referent=
        span=[4,4][many]      id=3    class=token           referent=
        span=[9,4][feet]      id=4    class=token           referent=
        span=[14,2][in]       id=5    class=token           referent=
        span=[17,1][5]        id=6    class=token           referent=
            decorations=
                [is_numeric]->true
        span=[19,6][meters]   id=7    class=token           referent=
        span=[9,4][feet]      id=9    class=measurement_name
            referent=
        span=[19,6][meters]   id=14   class=measurement_name  referent=
            segmentation( )=(how)(many)[(feet)](in)(5)[(meters)]
            decorations=
                [domain]->[
                    {
                        "name":"reference",
                        "schema":"jabba",
                        "slots":{
                            "from":[ 14 ],
                            "quantity":[ 6 ],
                            "to":[ 9 ]
                        },
                        "task":"conversion"
                        "dimension":"measurement",
                    }
                ]
```

Implicit Rules.

In some instances, utilization of implicit rules may not be useful. Thus, implicit rules may be rejected. Optionally or alternatively, to facilitate or support an implicit rule, it may be useful to set an implicit field to true, if applicable.

Terms and Counting.

A term may comprise, for example, a complete match expression that matches a single span. For example, as illustrated above, match expressions, such as yahoo or "." may be considered terms. At times, terms may, for example, be counted like in RE syntax. Thus, the following rule may, for example, match all interpretations:
blah=.*;
Allowed counts may include, for example, "*" (e.g., zero or more), "?" (e.g., zero or one), and "+" (e.g., one or more).

Sequences and Alternations.

As was indicated, sequences and alternations may, for example, comprise certain kinds or types of terms. For example, curly braces may specify an ordered sequence of terms to be matched. In some instances, curly braces may, for example, be used to indicate a sequence of spans. Thus, consider:
blah={yahoo search};
This rule may, for example, match a two-span interpretation whose spans are the tokens yahoo followed by search. Note that, in some instances, the following construct may not be supported or otherwise legal according to Jabba syntax, for example:
blah=yahoo search;
Since sequences may comprise terms, example rules illustrated below may be considered equivalents with respect to one or more matching operations defined by the original rule:
blah={{yahoo search}};
blah={{yahoo} {search}};
blah={{{yahoo} {search}}};
However, it should be noted that Jabba sequences and alternations may not be empty. Thus, an example construct illustrated below may be unsupported or otherwise illegal:
blah={yahoo search { }};
Sequences and terms may, for example, be counted as:
blah={yahoo search}?; // match empty query or segmentations of (yahoo) (search)
In some instances, a Jabba sequence may comprise, for example, an unordered sequence, reversible sequence, or any combination thereof. For example, an unordered sequence may be defined via a tilde before a curly brace or:
blah=~{a b c};
This example may, for example, match an interpretation with any permutation of the three tokens (a) (b) (c), (a) (c) (b), (b) (a) (c), (b) (c) (a), (c) (a) (b), (c) (b) (a). To handle a sufficient number of permutations, in some instances, it may be useful, for example, to limit unordered sequences to a certain number of terms. By way of example but not limitation, in one particular simulation or experiment, unordered sequences were limited (e.g., by a compiler, etc.) to six terms, though claimed subject matter is not so limited.

A reversible sequence may, for example, be defined via a caret before a curly brace or:
blah=^{a b c};
This sequence may, for example, match (a) (b) (c) or (c) (b) (a).

Here, both sequences may be considered terms and may be counted. Thus, consider, for example:
blah=^{yahoo search}?; // match empty query or (yahoo) (search) or (search) (yahoo)

It should be noted that a count may, for example, apply to a whole sequence. Thus, for this example, just (yahoo) or (search) may not match.

With regard to alternations, as also previously illustrated, square brackets may, for example, be used:
blah=[yahoo search]; // match (yahoo) or (search)
Square brackets may, for example, denote that any one of terms or subterms may be used to match at that point in an input sequence. It should be noted that in Jabba, alphanumeric string literals may not be quoted.

As another illustration, an example pattern:
directions=^{{from [here <place_name>]} {to [here <place_name>]}};
may, for example, match (from) (san Jose) (to) (here) or (to) (Hawaii) (from) (san diego). Also, from may, for example, be made optional in the first form, if desired, but not in the second as:

```
directions = [
    { from? [here <place_name>] to    [here <place_name>] }
    { to     [here <place_name>] from [here <place_name>] }
];
```

Sequences and alternations may be nested or counted, such as using operators*+?, for example, as was indicated. Again, these are merely examples relating to sequences and alternations, and claim subject matter is not limited in this regard.

Calls and Private Rules.

As indicated above, a call is a term that may act as if a called rule's term is substituted at a call site. For example, rules may make calls to other rules using syntax @rulename. Thus, consider:

```
private LOCATION = [ here <place_name> ];
directions = [
    { from? @LOCATION to    @LOCATION }
    { to    @LOCATION from @LOCATION }
];
```

As seen in this example, the above directions rule may be defined to use a call, which may make the rule simpler. As also illustrated, the LOCATION rule also introduces a Jabba keyword private. As used in the context of programming languages, "keyword" may refer to one or more grammatical constructs, such as one or more reserved words, for example, that may identify a syntactic form. A "private" rule, as the term used herein, may refer to a rule that may not be considered a top-level rule for matching. For example, at times, if an interpretation is evaluated, it may be run against all non-private rules in a file.

Depending on an implementation, a call may be to an ordinary or private rule, for example, and may be nested as long as no call cycles are created. For purposes of illustration, constructs illustrated below may be unsupported or otherwise illegal:
A=[b @B];
B=[a @A];
One or more actions as well as return values associated with calls will be described in greater detail below.

Match Expressions.

In at least one implementation, one or more terms comprising a match expression may be used, at least in part, by a suitable application, such as interpretation tagger mentioned above, for example, to match a single span. By way of example but not limitation, in an implementation, at least four types or kinds of match expressions may be utilized. For example, the following match expressions may be considered:

```
blah = . ;                   // match any span
blah = \yahoo ;              // match the span "yahoo"
blah = yahoo ;               // match the token span "yahoo"
blah = <person_name> ;       // match a span whose class is
                             "person_name"
```

As was previously mentioned, in some instances, such as anywhere a string is accepted, for example, bare identifier syntax or JSON string syntax may be used, at least in part. In addition, angle bracket-type syntax for span classes may, for example, be used to match decorations as well. Depending on a system, specifics about a particular span may, for example, be entered as decorations, typically as a node in taxonomy, for example. As was previously illustrated in the britney spears span in the example above:

```
...
span=[0,14][britney spears] id=8 class=person_name
decorations=
    [ ^taxonomy:notability_category]->"/notable"
```

At times, if it is desirable or useful to facilitate or support a match only if the class is person_name and there is a decoration with the key ^taxonomy:notability_category in the decorations, for example, the following expression may be used:
<person_name:"^taxonomy:notability_category">
As seen, a colon or ":" element followed by a decoration key may, for example, be added for a required or otherwise suitable match.

Further, to match only on the /notable node in this taxonomy, consider the following example construct:
<person_name:"^taxonomy:notability_category"="/notable">
As seen, an equals sign as well as a decoration value may, for example, be appended for matching. It should be noted that if any such decoration exists in span's decorations, a span may match.

For matching one or more taxonomy nodes, a shorthand notation equivalent to the previous expression may, for example, be used or:
<person_name:notability_category@"/notable">
The @ sign may cause a decoration key to the left to be prepended with ^taxonomy:. This may, for example, match a single node in the taxonomy, but, at times, it may be desirable to match a node or any node below such a node, for example.

This may be facilitated by appending an ellipsis to the decoration value, such as, for example:

<person_name:notability_category@"/notable" ...>

In certain simulations or experiments, it has been observed that the above expression may be advantageous. For example, the above expression may be relatively faster to execute than the equivalent expression illustrated below:

```
<person_name> && (
    %AttributeEq ("^taxonomy:notability_category","/notable" ) ||
    %AttributeMatchesRegex("^taxonomy:notability_category",
    "/notable/.*")
)
```

At times, a class may, for example, be left out. Thus, to match a span of any class containing the above notable attribute, consider, for example:

<:notability_category@"/notable" ...>

In some instances, such as if a class or attribute are left out, for example, an expression may match any span. The following two elements may, for example, be equivalent:

< >

In an implementation, a shorthand for checking Boolean attributes may, for example, be used. Thus, consider, for example, these equivalents:

```
<organization_name:is_company?>
<organization_name:is_company=true>
```

It should be noted that in some instances an attribute value of a span that is being evaluated may be of Boolean JSON type in order to match. To illustrate, the above expressions would not match a JSON-type value of 1 (e.g., an integer type), "true" (e.g., a string), or the like. Also, note the meaning of negation:

```
!<organization_name:is_company?>
<organization_name:is_company=false> // not the same thing!
```

Here, the first construct may, for example, match any JSON-type value that is not a Boolean true, meaning that it may match both false (e.g. Boolean type) and "true" (e.g., string type). The second construct may, for example, match only a JSON-type Boolean value of false.

Logical Expressions.

In some instances, match expressions may, for example, be built up from subexpressions, such as using logical operators && (and), || (or), and ! (not), and using parentheses for grouping. For example, to match two more specific nodes in the notability taxonomy, consider using the following:

```
<person_name:notability_category@"/notable/arts_media
/musician"> ||
<person_name:notability_category@"/notable/athlete">
```

It should be noted that logical-or may be different from alternation. Consider, for example, these two rules:
rule1=[a b];
rule2=a||b;
For this example, rule1 has an alternation of two terms, and rule2 has a single term. They may match the same or similar expressions but, at times, differences in structures may have two implications. First, actions may only be attached to terms, for example; thus, if it is useful to have a different action for a and b, rule1 may be used. Second, counts may apply to terms rather than subexpressions, or:
rule1a=[a b]*;
rule1b=[a b*];
rule2a=(a||b)*;
rule2b=a||b*;

Here, rule2a and rule2b may, for example, be equivalent because the "*" count may apply to the whole match expression as a term. Thus, both rules may match the same expression as rule1a. Also, note that rule1b may not match the same expression as rule2b.

Because logical-or may be more efficient to execute than alternation, for example, in some instances, a compiler may automatically transform simple alternations of match expressions with no actions or counts into logical-or constructs. Thus, rule1a may be converted to rule2a, for example, but if an action were attached to a or b, this may not be useful to implement.

Built-Ins.

A built-in is a function of one or more spans that may return true or false values and may be used, at least in part, as match expressions or subexpressions. A call to a built-in may, for example, start with "%" and a built-in name followed by a parenthesized, comma-separated list of arguments. For example, rules in each pair may be equivalent:
rule1a=.;
rule1b=% True( );
rule2a=!.;
rule2b=% False( );
rule3a=\blah;
rule3b=% Eq("blah");
rule4a=blah;
rule4b=% TokenEq("blah");
rule5a=<blah>;
rule5b=% ClassEq("blah");

Certain built-ins may not be supported via shorthand syntax, for example:
rule1=% NumTokensIs(2);
rule2=% AttributeMatchesRegex
("^taxonomy:notability_category","^/notable.*");

At times, built-ins may, for example, be combined similarly to a match expression:
rule=madonna||<person_name>&& %NumTokensIs(2) && % AttributeMatchesRegex("^taxonomy:notability_category", "^/notable.");

Actions.

As previously mentioned, a rule may include an implicit action so as to create a domain object in interpretation's decorations, named after the rule. In some instances, it may be desirable to trigger other actions on a suitable part of a rule, for example, to modify an interpretation's decorations, set variables that may be used later in the rule or higher up in a calling rule, or the like.

In Jabba, a term may have zero or more actions characterized via the term. If a rule matches an interpretation, for example, an action may be triggered at the time a term is matched. In one implementation, by default, a term may typically have no characterized actions, but one or more actions may, for example, be added by appending action syntax to the end of the term. Claimed subject matter is not limited to a particular implementation, of course.

Slot Assignments.

As previously mentioned, a term followed by a "#" sign and a string may, for example, create an action, such that if the term is matched, a slot is created in an interpretation named by that string and whose value is an array of span IDs that the term matched.

In some instances, shorthand syntax for a more verbose slot assignment may, for example, be used. Thus, consider these equivalents:

person=<person_name>#person;
person=<person_name>'person:$^';

As illustrated, a backtick notation may, for example, be employed to specify one or more actions, and a "#" shorthand may be employed, such as for purposes of convenience, among others. In addition, a $^ symbol may be used for a span cover or list of span IDs of spans that the match covered and in the order in which the spans appeared in an interpretation. Also, 'person:$^' may, for example, be used to create a slot called person and set its value to the span cover.

In some instances, backtick notations may, for example, be employed to define more than one action. For example, in more verbose syntax, backtick notations may, for example, be separated by semicolons:

person=<person_name>'person:$^;name:$^';

This rule may, for example, specify two actions via a term. It should be appreciated that due, at least in part, to multiple actions, there may be no equivalent to a "#" shorthand notation. If this rule is run on the following interpretation

```
Interpretation:
    id=15
    Modification:
        id=1
        query=[britney spears]
        span=[0,7][britney]     id=2    class=token
        span=[8,6][spears]      id=3    class=token
        span=[0,14][britney spears]     id=8    class=person_name
        segmentation( )=[(britney)(spears)]
``` the rule may match. In addition, here, two slots may, for example, be added to the interpretation's decorations under the person domain:

```
...
decorations=
    [domain]->[
        {
            "name":"person",
            "schema":"jabba",
            "slots":{
                "person":[8],
                "name":[8]
            }
        }
    ]
```

Action Order.

In some instances, such as if a rule is being matched against an interpretation, for example, one or more actions may be queued while the matches happen, but only if the full rule matched queued actions applied to the interpretation. If multiple actions are specified via a term, they may be queued left-to-right, for example, which may be useful with respect to general assignments, as will be seen.

For nested terms, one or more actions from the innermost term may, for example, be triggered first. To illustrate, for a rule:

blah={a#X}#Y;

a triggered action sequence may comprise, for example, #x, #Y.

As another illustration, for a rule:
blah={a 'X1:$^;X2:$^'}'Y1:$^;Y2:$^';
a triggered action sequence may comprise, for example, #X1, #X2, #Y1, #Y2. Of course, these are merely examples relating to action orders, and claimed subject matter is not limited in this regard.

General Assignments.

A general assignment may comprise, for example, a type or kind of action that may allow assigning one or more arbitrary key-value pairs in a domain object. In other words, a general assignment may, for example, facilitate or support associating arbitrary key-value pairs in one or more match actions. General assignments may, for example, employ an equals sign instead of ":" as in:

person=<person_name>'name:&^;type="unknown"';

This action sequence may, for example, create a name slot and a general assignment of "unknown" to the type key. For example, in the britney spears interpretation above, the following domain object may be added:

```
...
decorations=
    [domain]->[
        {
            "name":"person",
            "schema":"jabba",
            "slots":{
                "name":[8]
            },
            "type":"unknown"
        }
    ]
```

Please note that with respect to the "type":"unknown" entry in the object, the left-hand side of a general assignment may comprise any string, for example, and the right-hand side may comprise any JSON-type object, the span cover $^, or a variable name (e.g., the JSON-type string "unknown"). It should also be appreciated that, at times, one or more fields in an object, such as name, schema, or slots, for example, may be reserved in a Jabba schema. General assignments may, for example, be rule-dependent or may require a consumer of an object to know more about fields than may be inferred from a schema.

Variable Assignments.

In some instances, such as during an evaluation of a rule, for example, a suitable Jabba machine may keep a context of variables created as the rule is used. Variable names may, for example, be preceded by a "$" sign and may appear on the left- or right-hand side of a general assignment. Thus, consider:

person={<person_name>'$name=$^'}'name:$name';
person=<person_name>#name;

These two rules may, for example, create a slot name with a span cover for person_name. The first rule, however, may create this slot in two steps: first, by assigning a span cover for person_name to the variable $name; and second, by creating a slot name using the value of $name.

In at least one implementation, a special variable $ may, for example, be used for a return value of a rule. This may be combined with calls, for example, which may help in breaking up a relatively complicated rule. A call may be followed by a colon or ":" and a variable name to receive a return value. To illustrate, the directions rule above may, for example, be redefined as:

```
private LOCATION = [ here <place_name> ]`$=$`;
directions = [
    { from? @LOCATION:$origin to @LOCATION:$destination }
    { to @LOCATION:$destination from @LOCATION:$origin }
] `origin:$origin; destination:$destination`;
```

As seen, the LOCATION rule may set a return value to a span cover, and a calling rule may assign the return value to an appropriate variable. As also illustrated, an action sequence for an outer alternation may, for example, make correct slot assignments. Thus, on the following example interpretation

```
Interpretation:
    id=25
    Modification:
        id=1
        query=[here to sfo]
    span=[5,4][here] id=3 class=token
    span=[10,2][to] id=4 class=token
    span=[13,3][sfo] id=5 class=token
    span=[13,3][sfo] id=7 class=place_name
    segmentation( )=(here)(to)(sfo)
``` the following domain object may, for example, be obtained:

```
...
decorations=
    [domain]->[
        {
            "name":"directions",
            "schema":"jabba",
            "slots":{
                "origin":[3],
                "destination":[7]
            }
        }
    ]
```

It should be appreciated that the above examples are provided for the purpose of understanding of one or more concepts, and that claimed subject matter is not so limited. For example, the above LOCATION rule may also be defined as:

```
private LOCATION = [ here <place_name> ];
directions = [
    { from? @LOCATION#origin to @LOCATION#destination }
    { to @LOCATION#destination from @LOCATION#origin }
];
```

Accordingly, as discussed herein, Jabba may provide benefits. For example, as previously mentioned, rich matching as well as action semantics may allow Jabba to be used, at least in part, in connection with a number of text processing or modeling applications. In addition, Jabba may enable more sophisticated matching of text than its predecessors, for example. Jabba is more suited to structured text than GSL, for example, thus, allowing for relatively easier development of matching tasks that may otherwise be labor-intensive. As was also indicated, to classify a particular interpretation, for example, instead of manually building a relatively complex machine, the following Jabba rule may, for example, be implemented:

```
private LOCATION = [ "here" < place_name > ];
directions = [
    { "from"? @LOCATION#origin "to" @LOCATION#destination }
    { "to"    @LOCATION#destination "from" @LOCATION#origin }
];
```

Here, a LOCATION rule may, for example, specify that the word "here" or any text classified as a place_name may be used to describe a location. In addition, the directions rule may describe, for example, any sequence of the form "from LOCATION to LOCATION" or "to LOCATION from LOCATION". Also, the LOCATION matches may be named "origin" and "destination" according to the match, so that a client may identify which text made up the origin and which the destination directly from the Jabba match result itself, such as without having to reparse the text, for example. It should be noted that the term "from" may be optional in certain example implementations.

As another benefit, even a relatively simple Jabba pattern, such as illustrated above, for example, may not be sufficiently implemented with RE or GSL since the LOCATION rule does not match just a simple string (e.g., such as "here") but any atom (e.g., structured text fragment) classified as a "place_name". Such structured text is not sufficiently representable in RE or GSL alphabets (e.g., characters, symbols, etc.), as was also indicated. In addition, Jabba may provide for two-level scope to sub-rules, for example, and more expressive syntax for specifying unordered or reversible sequence matching.

Also available actions in RE may, for example, be limited to essentially capturing matched segments in a pattern buffer. In GSL, for example, matched segments (e.g., "slots") may be named. In Jabba, however, GSL-type slotting may be advantageously expanded to support concatenation to unify non-contiguous atoms, for example. Jabba slotting may also include a general assignment mechanism that may, for example, enable arbitrary client code to be invoked to sufficiently handle any part of a match.

As a way of another example, consider a relatively more complex Jabba rule implementation:

```
conversion_query = [
    {
        ~{ from? convert?#directive }
        {
            < token:is_numeric? >?#quantity
            < measurement_name >#from
            to?
            < measurement_name >?#to
        }
    } `task=command`
    {
        {how many}?#directive
        < measurement_name >#to
        < token:is_stopword? >?
        [in for]
        [ < token:is_numeric? >#quantity < token:is_stopword? > 
        ]?
        < measurement_name >#from
    } `task=question`
];
```

Here, a number of different natural language forms of a so-called units conversion query, such as "convert 25 inches to centimeters," "how many feet in a mile?", or the like may, for example, be advantageously captured. In addition, parts of a query that may correspond to slot names "quantity", "from", "to", or "directive" may be automatically identified to a client. Also, the 'task' assignment may, for example, allow naming of defining a form of a sequence matched. For example, in the "convert 25 inches to centimeters" query, a match result may include task=command, and in the "how many feet in a mile?" query, it may include task=question. Of course, such a description of certain aspects of Jabba and its benefits is merely an example, and claimed subject matter is not so limited.

Following the above discussion, FIGS. 1-7, which are self-explanatory, illustrate an implementation of a Jabba grammar that may be used, in whole or in part, to facilitate or support one or more processes or operations in connection with Jabba language. It should be noted that a Jabba grammar is provided herein by way of a non-limiting example or in an explanatory way that may be helpful in describing Jabba syntax. Thus, for purposes of explanation, one or more Jabba constructs, terms, strings, arrays, tokens, rules, etc. may, for example, be described in the context of Flex-type lexical analyzer, accessible at flex.sourceforge.net, Bison-type parser generator, accessible at www.gnu.org/software/bison, or any combination thereof. Claimed subject matter is not limited in this regard, of course. As previously mentioned, it should also be appreciated that in some instances, JSON-type string syntax may, for example, be utilized, such as if appropriate or applicable. Accordingly, those of skill in the art may recognize that Jabba grammar may be implemented in a variety of ways or that content or context illustrated in FIGS. 1-7 may be rearranged, combined, omitted, inputted, incorporated, reapplied, redefined, or otherwise used, in whole or in part, without departing from illustrated principles. For example, in some instances, Jabba grammar may provide input to one or more suitable software tools for automatically generating a high-level program structure or skeleton of a parser that may be incorporated into one or more suitable programs to allow parsing of an applicable Jabba code. Again, claimed subject matter is not so limited.

Referring now to FIG. 1, which is an example of an implementation of Flex-specified or defined tokens that may be used, at least in part, in connection with Jabba language. As used herein, "token" may refer to one or more elementary units of a language that may comprise zero or more characters. In Jabba, tokens may, for example, be represented via one or more reserved words (e.g., private, true, false, null, etc.), strings or numbers (e.g., "person", 3.2, etc.), operators or punctuation (e.g., & &, #, {, etc.), or the like. One or more Flex-specified tokens may, for example, map regular expressions on the right side to token names on the left side, just to illustrate one possible implementation. Thus, for this example, Flex may generate code, such that if Jabba code is input as a stream of characters, for example, and a tokenizer may emit one or more named tokens with character strings that matched each token pattern. Again, claimed subject matter is not limited to tokens defined using Flex-type syntax.

FIGS. 2-7 are examples of an implementation of one or more production rules specified or defined for purposes of explanation via Bison compatible-type syntax, though claimed subject matter is not so limited. Production rules may, for example, describe how to build up valid sequences of tokens in Jabba language. More specifically, each production rule may comprise, for example, a name for a rule that may follow each valid sequence of terminals (e.g., tokens, etc.) or non-terminals (e.g., production rule names, etc.) that may be matched in input or replaced by a suitable rule name. Each sequence may have an associated snippet of code or data structure, for example, that may allow a client to build up a complete parse tree of input or, optionally or alternatively, reject invalid input with intelligible error messages.

It should be noted that by convention, in Bison, one or more Flex token names may, for example, be referred to in all upper-case, as particularly seen in an example % token section of FIG. 2. It should also be appreciated that one or more tokens that are defined or specified via Flex but are not in the % token section of Bison (e.g., punctuation, etc.) may be referred to by a character instead of a token name, such as via '=' instead of PUNCTUATION, for example, as seen in an example production rules section of FIGS. 2-7. As a way of illustration in connection with an example Jabba input:
twiki="bidi"+;
A tokenizer may, for example, emit a token stream that in Bison may correspond to:
IDENTIFIER=JSON_STRING+;
A parser may then build up the following parse tree by applying one or more rules bottom-up, such as, for example:

```
IDENTIFIER  =  string     +  ;   (string rule)
IDENTIFIER  =  match_expr  +  ;   (match_expr rule)
IDENTIFIER  =  term       +  ;   (term rule)
IDENTIFIER  =  counted_term  ;   (counted_term rule)
IDENTIFIER  =  expr       ;      (expr rule)
rule    (rule rule)
rules rule   (rules rule, reducing nothing (empty) to rules)
rules   (rules rule)
```

Along the way, such as while facilitating or supporting one or more processing operations with respect to these one or more rules, Bison actions (e.g., code snippets, etc.) characterized via each rule may, for example, be capable of building up a suitable parse tree. By way of example but not limitation, in one particular simulation or experiment, a parse tree included one illustrated below:

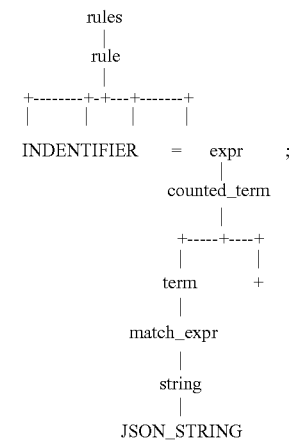

Here, a parse tree may, for example, be converted via one or more Bison actions into an abstract syntax tree (AST) whose nodes are objects representing each construct. A suitable compiler may perform one or more optimization operations on an AST to reduce complexity, for example, and may build a suitable state machine capable of executing a compiled Jabba code against input sequences or graphs of Jabba atoms. Of course, these are merely details relating to Jabba grammar, and claimed subject matter is not so limited.

With this in mind, attention is now drawn to FIG. 8, which is a flow diagram illustrating an implementation of an example process 800 that may be performed via one or more special purpose computing devices, in whole or in part, to facilitate or support one or more operations for Jabba language. It should be noted that content applied or produced, such as, for example, inputs, applications, outputs, operations, results, etc. associated with example process 800 may be represented by one or more digital signals. It should also be appreciated that even though one or more operations are illustrated or described concurrently or with respect to a certain sequence, other sequences or concurrent operations may also be employed.

Example process 800 may begin, for example, at operation 802, with generating one or more digital signals representative of a rule descriptive of one or more named terms corresponding to at least one of the following: a match expression; a sequence; an alternation; a call; or any combination thereof. As previously mentioned, a rule may, for example, identify an overall meaning for an interpretation and create one or more slots for relevant parts of the interpretation. In some instances, one or more digital signals representative of a rule may, for example, be generated via a suitable rule-based or supported text processing environment, which may include a computing environment illustrated in FIG. 9, just to illustrate one possible implementation. For example, one or more digital signals may, for example, be accepted as input to define or characterize one or more named terms in connection with various types of authoring applications (e.g., data editors, structure outliners, etc.), which may allow for a more efficient or otherwise suitable compilation, interpretation, parsing, or the like. In some instances, one or more named terms may be processed or pre-processed in some manner, for example, and may be outputted via one or more converted or transformed patterns or structures to support an appropriate format. For example, a processing environment may analyze a sequence of characters to determine whether they are correctly or efficiently specified and may generate appropriate recommendations so as to refine definitions or characterizations of named terms, automatically or editorially. In at least one implementation, a processing environment may generate an input set of desired Jabba characteristics represented as one or more syntactically or semantically correct rule templates, for example, to facilitate or support enhanced or otherwise suitable results.

At operation 804, one or more named terms may, for example, be electronically incorporated into a language external to a compiler to enable at least one matching operation with respect to one or more sequences of candidate atoms based, at least in part, on one or more named terms. For example, in some instances, a custom database associated with a suitable library comprising one or more digital signals stored in a non-transitory storage medium and representing one or more named terms may, for example, be created or built. One or more named terms may, for example, be incorporated into a language for matching or generating particular sequences of text (e.g., structured text, etc.), just to illustrate one possible implementation. Thus, in some instances, a language may, for example, facilitate or support a particular linguistic task or application or, optionally or alternatively, a variety of more general tasks or applications, or any combination thereof.

In some instances, at least one matching operation may, for example, be enabled via mapping a library abstract atom data type (e.g., of one or more named terms, etc.) to an application's concrete type and implementing callbacks to map Jabba actions into application-specific functionality. A library may comprise, for example, a standalone pattern-matching C++ library, though claimed subject matter is not so limited. For example, at times, a library may comprise a run-time or like library associated with a suitable run-time environment or system. In at least one implementation, a library may provide an application programming interface (API) to facilitate or support compiling Jabba rules into a suitable machine, such as a nondeterministic finite automaton (NFA) or state machine, for example. Again, claimed subject matter is not limited in this regard. A machine may, for example, be used, at least in part, to match individual candidate atom sequences or to find all possible matches of a partially ordered set of candidate atoms. To illustrate, if a match is found, for example, a client may receive a callback containing a name of a rule that matched as well as all triggered actions. A client may subsequently decide whether or not to continue finding further matches.

In an implementation, a client may pass a sequence of candidate atoms, for example, representative of one or more named terms as input. A machine may find all rules that match input, for example, calling back to a client for each match. In some instances, a client may, for example, build a partially ordered set of candidate atoms and may pass it to a machine. A machine may execute every full sequence derivable from a set as input, for example, calling back to a client for each match. These tasks may proceed more efficiently if a graph of possible input sequences, such as using backtracking to minimize computation, for example, is employed. Of course, claimed subject matter is not limited to particular implementations or sequences shown.

With regard to operation 806, at least one action may, for example, be specified via one or more named terms represented via one or more digital signals. As discussed above, a slot assignment, general assignment, variable assignment, etc., or any combination thereof may, for example, be associated with a suitable data structure or construct to cause callbacks to a client to be invoked. In some instances, a callback may include, for example, a slot structure comprising a slot name and a list of atoms matched by a term characterized via a slot action. At times, a callback may comprise, for example, more than one action. For example, a client may receive two actions, such as a suitable slot and a general assignment structure comprising a key-value pair. In at least one implementation, one or more calls may be implemented in connection with a special variable, such as to receive a return value, for example, as was also indicated. In some instances, multiple actions may, for example, be specified via a named term. Here, actions may be queued left-to-right, for example, such as while matches occur or happen, though claimed subject matter is not so limited. With respect to one or more nested named terms, actions from an innermost term may, for example, be triggered first.

At operation 808, one or more named terms incorporated into a language may be stored in a suitable storage medium, such as a non-transitory memory, for example, as one or more digital signals. A non-transitory storage medium or memory will be discussed in greater detail below. As was indicated, in some instances, these one or more digital signals may be associated, in whole or in part, with a suitable library, such as a standalone pattern-matching library, a run-time library, etc., just to illustrate a few possible implementations. It should be appreciated that Jabba language may, for example, be compatible with one or more rule interpretation engines that may be associated with a suitable compiler, interpreter, or the like, to facilitate or support one or more processes or operations discussed above.

Figure 9:
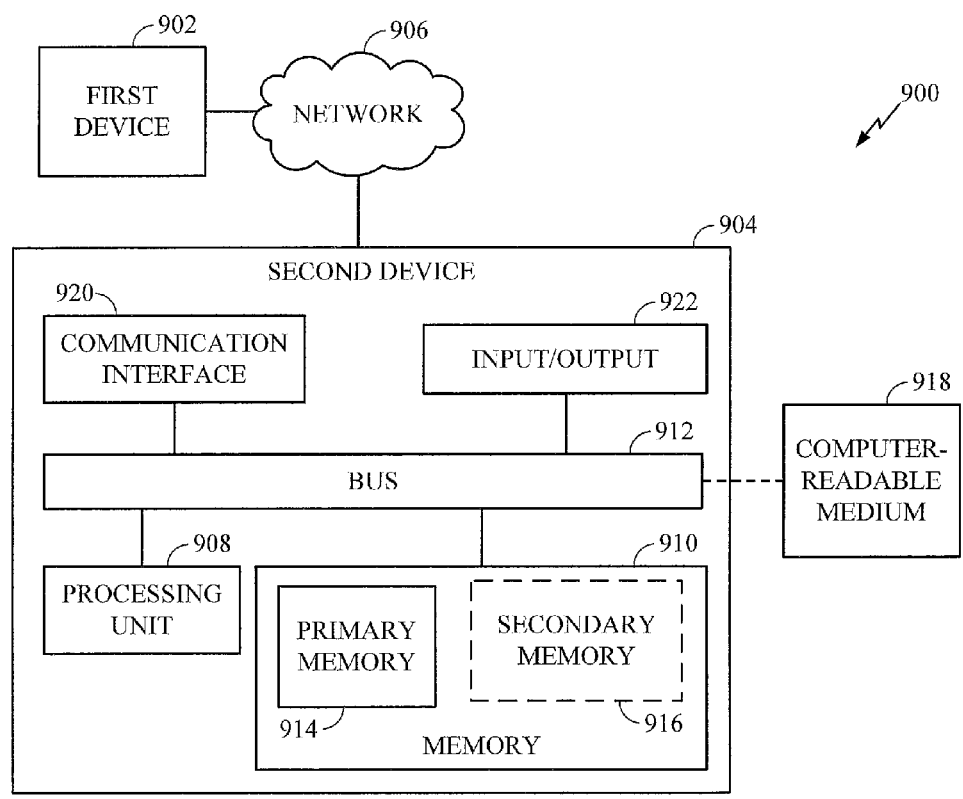
FIG. 9 is a schematic diagram illustrating an implementation of a computing environment associated with one or more special purpose computing apparatuses.

FIG. 9 is a schematic diagram illustrating an example computing environment 900 that may include one or more devices capable of implementing, in whole or in part, one or more processes or operations for Jabba language, such as discussed above in connection with FIGS. 1-8, for example. Computing environment system 900 may include, for example, a first device 902 and a second device 904, which may be operatively coupled together via a network 906. In an embodiment, first device 902 and second device 904 may be representative of any electronic device, appliance, or machine that may have capability to exchange content or like signals over network 906. Network 906 may represent one or more communication links, processes, or resources having capability to support exchange or communication of content or like signals between first device 902 and second device 904. Second device 904 may include at least one processing unit 908 that may be operatively coupled to a memory 910 through a bus 912. Processing unit 908 may represent one or more circuits to perform at least a portion of one or more applicable computing operations or processes. For example, depending on an implementation, processing unit 908 may facilitate or support generating one or more digital signals representative of a rule descriptive of one or more named terms, such as in a manner discussed above. In addition, in some instances, processing unit 908 may be capable of electronically incorporating one or more named terms into a language external to a compiler. This may, for example, enable at least one matching operation with respect to one or more sequences of candidate atoms based, at least in part, on these one or more named terms, as was also discussed.

Memory 910 may represent any signal storage mechanism or appliance. For example, memory 910 may include a primary memory 914 and a secondary memory 916. Primary memory 914 may include, for example, a random access memory, read only memory, etc. In certain implementations, secondary memory 916 may be operatively receptive of, or otherwise have capability to be coupled to a computer-readable medium 918. In some instances, memory 910 or any portion thereof may comprise, for example, a non-transitory memory, as discussed below, and may be used, at least in part, for storing one or more named terms incorporated into a language.

Computer-readable medium 918 may include, for example, any medium that may store or provide access to content or like signals, such as, for example, code or instructions for one or more devices in operating environment 900. It should be understood that a storage medium may typically, although not necessarily, be non-transitory or may comprise a non-transitory device. In this context, a non-transitory storage medium may include, for example, a device that is physical or tangible, meaning that the device has a concrete physical form, although the device may change state. For example, one or more electrical binary digital signals representative of content, in whole or in part, in the form of zeros may change a state to represent content, in whole or in part, as binary digital electrical signals in the form of ones, to illustrate one possible implementation. As such, "non-transitory" may refer, for example, to any medium or device remaining tangible despite this change in state.

Second device 904 may include, for example, a communication adapter or interface 920 that may provide for or otherwise support communicative coupling of second device 904 to a network 906. Second device 904 may include, for example, an input/output device 922. Input/output device 922 may represent one or more devices or features that may be able to accept or otherwise input human or machine instructions, or one or more devices or features that may be able to deliver or otherwise output human or machine instructions.

According to an implementation, one or more portions of an apparatus, such as second device 904, for example, may store one or more binary digital electronic signals representative of content expressed as a particular state of a device such as, for example, second device 904. For example, an electrical binary digital signal representative of content may be "stored" in a portion of memory 910 by affecting or changing a state of particular memory locations, for example, to represent content as binary digital electronic signals in the form of ones or zeros. As such, in a particular implementation of an apparatus, such a change of state of a portion of a memory within a device, such a state of particular memory locations, for example, to store a binary digital electronic signal representative of content constitutes a transformation of a physical thing, for example, memory device 910, to a different state or thing.

Thus, as illustrated in various example implementations or techniques presented herein, in accordance with certain aspects, a method may be provided for use as part of a special purpose computing device or other like machine that accesses digital signals from memory or processes digital signals to establish transformed digital signals which may be stored in memory as part of one or more content files or a database specifying or otherwise associated with an index.

Some portions of the detailed description herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels.

Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other content storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example.

While certain example techniques have been described or shown herein using various methods or systems, it should be understood by those skilled in the art that various other modifications may be made, or equivalents may be substituted, without departing from claimed subject matter. Additionally, many modifications may be made to adapt a particular situation to the teachings of claimed subject matter without departing from the central concept(s) described herein. Therefore, it is intended that claimed subject matter not be limited to particular examples disclosed, but that claimed subject matter may also include all implementations falling within the scope of the appended claims, or equivalents thereof.

What is claimed is:

1. A method comprising:
    generating one or more digital signals representative of a rule in a Jabba language construct descriptive of one or more named terms corresponding to at least one of the following: a match expression; a sequence; an alternation; a call; or any combination thereof;
    electronically incorporating said one or more named terms into a language external to a compiler to enable at least one matching operation with respect to one or more sequences of candidate atoms based, at least in part, on said one or more named terms; and
    storing said one or more named terms incorporated into said language in a non-transitory memory.

2. The method of claim 1, and further comprising specifying at least one action via said one or more named terms represented via said one or more digital signals.

3. The method of claim 2, wherein said at least one action is specified by defining a form of said one or more sequences of said candidate atoms.

4. The method of claim 3, wherein said form comprises a natural language form.

5. The method of claim 2, wherein said at least one action is capable of generating one or more slots descriptive of said one or more sequences of candidate atoms based, at least in part, on said at least one matching operation.

6. The method of claim 1, wherein at least one of said one or more sequences of said candidate atoms comprises said one or more candidate atoms.

7. The method of claim 1, wherein said one or more candidate atoms comprises a data structure representing at least one of the following: a fragment of text; a class; a set of key-value attributes; or any combination thereof.

8. The method of claim 1, wherein said one or more candidate atoms comprises one or more non-contiguous candidate atoms.

9. The method of claim 1, wherein said rule is capable of creating at least one domain object representative of said rule.

10. The method of claim 1, wherein said at least one matching operation comprises at least one of the following: an unordered sequence matching operation; a reversible sequence matching operation; or any combination thereof.

11. The method of claim 1, wherein said at least one matching operation is enabled with respect to one or more portions of said one or more candidate atoms.

12. The method of claim 1, wherein said one or more candidate atoms are associated with a search query.

13. The method of claim 1, wherein said non-transitory memory is associated with a library.

14. The method of claim 13, wherein said library comprises at least one of the following: a pattern-matching library; a run-time library; or any combination thereof.

15. The method of claim 1, wherein said language is compatible with one or more rule interpretation engines associated with a compiler.

16. The method of claim 1, wherein said electronically incorporating said one or more named terms into said language external to said compiler further comprises generating at least one data structure capable of minimizing at least one computation operation via backtracking based, at least in part, on a partially-ordered set of said candidate atoms that concisely represents said one or more sequences of said candidate atoms.

17. An apparatus comprising:
    a computing platform comprising at least one processor configured to:
        generate one or more digital signals representative of a rule in a Jabba language construct descriptive of one or more named terms that shall correspond to at least one of the following: a match expression; a sequence; an alternation; a call; or any combination thereof;
        electronically incorporate said one or more named terms into a language external to a compiler to enable at least one matching operation with respect to one or more sequences of candidate atoms via said one or more named terms; and
        store said one or more named terms as part of said language in a non-transitory memory.

18. The apparatus of claim 17, wherein said at least one processor further to specify at least one action via said one or more named terms.

19. The apparatus of claim 17, wherein said one or more candidate atoms comprises a data structure that shall be represented via at least one of the following: a fragment of text; a class; a set of key-value attributes; or any combination thereof.

20. An article comprising:
    a non-transitory storage medium having instructions stored thereon executable by a special purpose computing platform to:
        generate one or more digital signals representative of a rule in a Jabba language construct descriptive of one or more named terms that shall correspond to at least one of the following: a match expression; a sequence; an alternation; a call; or any combination thereof; and
        electronically incorporate said one or more named terms into a language external to a compiler to enable at least one matching operation with respect to one or more sequences of candidate atoms via said one or more named terms.

21. The article of claim 20, wherein said non-transitory storage medium further includes instructions to specify at least one action via said one or more named terms.

* * * * *